US012436655B2

(12) United States Patent
Lee et al.

(10) Patent No.: US 12,436,655 B2
(45) Date of Patent: Oct. 7, 2025

(54) TOUCH PANEL AND DISPLAY DEVICE INCLUDING THE SAME

(71) Applicant: SAMSUNG DISPLAY CO., LTD., Yongin-si (KR)

(72) Inventors: Eung Kwan Lee, Yongin-si (KR); Tae Joon Kim, Yongin-si (KR); Ji Yeong Lee, Yongin-si (KR); Hyun Wook Cho, Yongin-si (KR); Jae Woo Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/637,955

(22) Filed: Apr. 17, 2024

(65) Prior Publication Data

US 2025/0077034 A1   Mar. 6, 2025

(30) Foreign Application Priority Data

Sep. 5, 2023 (KR) .......................... 10-2023-0117971

(51) Int. Cl.
*G06F 3/044* (2006.01)
*G06F 3/041* (2006.01)

(52) U.S. Cl.
CPC .......... *G06F 3/0448* (2019.05); *G06F 3/0416* (2013.01); *G06F 3/0446* (2019.05)

(58) Field of Classification Search
CPC ..... G06F 3/0448; G06F 3/0416; G06F 3/0446
See application file for complete search history.

(56) References Cited

U.S. PATENT DOCUMENTS

| | | | |
|---|---|---|---|
| 8,593,410 B2* | 11/2013 | Hong | G06F 1/16 345/173 |
| 8,680,877 B2* | 3/2014 | Lee | G06F 3/0446 345/170 |
| 9,927,904 B2 | 3/2018 | Lee | |
| 10,572,051 B2 | 2/2020 | Lee et al. | |
| 11,256,355 B2* | 2/2022 | Kang | G09G 3/20 |
| 11,327,590 B2* | 5/2022 | Miyamoto | G06F 3/0445 |
| 2014/0022210 A1* | 1/2014 | Wu | G06F 3/0446 345/174 |
| 2014/0076706 A1* | 3/2014 | Hsueh | G06F 3/0443 200/600 |
| 2014/0340354 A1* | 11/2014 | Liu | G06F 3/0443 345/174 |

(Continued)

FOREIGN PATENT DOCUMENTS

CN   108196736 A   6/2018
JP   2022-172398 A2   11/2022

(Continued)

*Primary Examiner* — Amy Onyekaba
(74) *Attorney, Agent, or Firm* — F. CHAU & ASSOCIATES, LLC

(57) ABSTRACT

A display device includes a plurality of touch cells, and a central area and an edge area. The plurality of touch cells is arranged in a first direction and a second direction crossing the first direction, and is located in the central area and the edge area. The edge area includes first to fourth sub-edge areas. Shapes of touch cells in the central area are different from shapes of touch cells in the edge area. Shapes of touch cells in the first and second sub-edge areas are different from shapes of touch cells in the third and fourth sub-edge areas.

20 Claims, 9 Drawing Sheets

(56) References Cited

U.S. PATENT DOCUMENTS

| | | | |
|---|---|---|---|
| 2015/0042600 A1* | 2/2015 | Lukanc | G06F 3/0412 |
| | | | 345/174 |
| 2016/0041654 A1* | 2/2016 | Bulea | G06F 3/041 |
| | | | 345/174 |
| 2016/0188034 A1* | 6/2016 | Bayramoglu | G06F 3/0446 |
| | | | 345/174 |
| 2016/0231853 A1* | 8/2016 | Weng | G06F 3/0443 |
| 2017/0212615 A1* | 7/2017 | Watanabe | G06F 3/0446 |
| 2017/0262094 A1* | 9/2017 | Badaye | G06F 3/0448 |
| 2018/0046276 A1* | 2/2018 | Hou | G06F 3/04166 |
| 2018/0224966 A1* | 8/2018 | Church | G06F 3/0446 |
| 2018/0321708 A1* | 11/2018 | Wu | G06F 3/0443 |
| 2019/0050097 A1* | 2/2019 | Mugiraneza | G06F 3/0446 |
| 2019/0064969 A1* | 2/2019 | Kiernan | G06F 3/04166 |
| 2019/0243489 A1* | 8/2019 | Xu | G06F 3/04186 |
| 2019/0294274 A1* | 9/2019 | Cho | G06F 3/0416 |
| 2020/0073514 A1* | 3/2020 | Kuo | G06F 3/0412 |
| 2020/0167038 A1* | 5/2020 | Lee | G06F 3/0443 |
| 2021/0117029 A1* | 4/2021 | Kang | G06F 3/04166 |
| 2022/0050554 A1* | 2/2022 | Feng | G06F 3/0443 |
| 2023/0115692 A1* | 4/2023 | Wei | G06F 3/04164 |
| | | | 345/174 |
| 2023/0198522 A1* | 6/2023 | Fujisawa, | G06F 3/04883 |
| | | | 349/141 |
| 2023/0325043 A1* | 10/2023 | Merced-Grafals | G06F 3/0448 |

FOREIGN PATENT DOCUMENTS

| | | |
|---|---|---|
| KR | 10-1963317 B1 | 3/2019 |
| KR | 10-2452527 B1 | 10/2022 |

\* cited by examiner

TXb: 710, 720, 730, 740, 750, 760, 770, 780, 790
RXp: RXpa, RXpb

TOUCH PANEL AND DISPLAY DEVICE INCLUDING THE SAME

CROSS-REFERENCE TO RELATED APPLICATION

This application claims priority under 35 U.S.C. § 119 to Korean Patent Application No. 10-2023-0117971, filed in the Korean Intellectual Property Office on Sep. 5, 2023, the disclosure of which is incorporated by reference herein in its entirety.

TECHNICAL FIELD

Embodiments of the present disclosure relate to a touch panel and a display device including the same.

Discussion of Related Art

A touch panel is an input device that is mounted on a surface of a display panel and converts physical contact of an object, such as a user's finger, into electrical signals so as to operate a product. The touch panel may be widely applied to various display devices. In recent years, with the trend toward intuitive interfaces, the touch panel has become a widely used input method in various mobile devices such as, for example, flat panel displays, smartphones, and tablet PCs.

SUMMARY

An object of an embodiment of the present disclosure is to provide a touch panel with uniform touch input sensitivity regardless of the position on the touch panel and a display device including the same. For example, an object of an embodiment of the present disclosure is to provide a touch panel with uniform touch input sensitivity regardless of the position on the touch panel by increasing touch input sensitivity of the edge of the touch panel and a display device including the same.

A touch panel in accordance with an embodiment of the present disclosure includes a plurality of touch cells, and a central area and an edge area. The plurality of touch cells is arranged in a first direction and a second direction crossing the first direction, and is located in the central area and the edge area. The edge area includes first to fourth sub-edge areas, shapes of touch cells in the central area among the plurality of touch cells are different from shapes of touch cells in the edge area, and shapes of touch cells in the first and second sub-edge areas among the plurality of touch cells are different from shapes of touch cells in the third and fourth sub-edge areas.

In an embodiment, touch cells in the central area each have at least one of a diamond shape, a circular shape, a rectangular shape, a triangular shape, and a mesh shape.

In an embodiment, the touch cells each include at least one of a metal conductive material and a transparent conductive material.

In an embodiment, the touch cells in the first and second sub-edge areas are arranged in the first direction, and the touch cells in the third and fourth sub-edge areas are arranged in the second direction.

In an embodiment, the touch cells in the edge area each include a first electrode and a second electrode that does not overlap the first electrode. The first electrode includes a central pattern having a rectangular shape in which a length of a side extending in the first direction is shorter than a length of a side extending in the second direction, and a plurality of peripheral patterns having a rectangular shape in which a length of a side extending in the first direction is longer than a length of a side extending in the second direction.

In an embodiment, the first electrode and the second electrode form mutual capacitances.

In an embodiment, some of the peripheral patterns of the touch cells in the first and second sub-edge areas extend from the central pattern in the first direction, and some of the remaining peripheral patterns of the touch cells in the first and second sub-edge areas extend from the central pattern in a direction opposite to the first direction.

In an embodiment, the peripheral patterns extending from the central pattern in the first direction and the some of the remaining peripheral patterns extending from the central pattern in the direction opposite to the first direction are symmetrical to each other with respect to the central pattern.

In an embodiment, peripheral patterns of the touch cells in the third sub-edge area among the plurality of peripheral patterns extend from the central pattern in a direction opposite to the first direction.

In an embodiment, the peripheral patterns of the touch cells in the third sub-edge area are spaced apart from each other in the second direction.

In an embodiment, lengths of sides of the peripheral patterns of the touch cells in the third sub-edge area extending in the first direction are about equal to each other, and lengths of sides of the peripheral patterns of the touch cells in the third sub-edge area extending in the second direction are about equal to each other.

In an embodiment, peripheral patterns of the touch cells in the fourth sub-edge area among the plurality of peripheral patterns extend from the central pattern in the first direction.

In an embodiment, the peripheral patterns of the touch cells in the fourth sub-edge area are spaced apart from each other in the second direction.

In an embodiment, lengths of sides of the peripheral patterns of the touch cells in the fourth sub-edge area extending in the first direction are equal to each other, and lengths of sides of the peripheral patterns of the touch cells in the fourth sub-edge area extending in the second direction are equal to each other.

A display device in accordance with an embodiment of the present disclosure includes a touch panel including a plurality of touch cells, a central area, and an edge area. The plurality of touch cells is arranged in a first direction and a second direction crossing the first direction, and is located in the central area and the edge area. The display device further includes a touch driver configured to sense a touch of an object approaching the touch panel. The edge area of the touch panel includes first to fourth sub-edge areas, shapes of touch cells in the central area of the touch panel among the plurality of touch cells are different from shapes of touch cells in the edge area of the touch panel among the plurality of touch cells, and shapes of touch cells in the first and second sub-edge areas among the plurality of touch cells are different from shapes of touch cells in the third and fourth sub-edge areas among the plurality of touch cells.

In an embodiment, the touch driver transmits a touch driving signal to the touch cells, and the touch driver receives a touch sensing signal from the touch cells.

In an embodiment, the touch cells in the edge area among the plurality of touch cells each includes a first electrode, and a second electrode that does not overlap the first electrode. The first electrode includes a central pattern having a rectangular shape in which a length of a side extending in the first direction is shorter than a length of a side extending in the second direction, and a plurality of peripheral patterns having a rectangular shape in which a length of a side extending in the first direction is longer than a length of a side extending in the second direction.

In an embodiment, some of the peripheral patterns of the touch cells in the first and second sub-edge areas extend from the central pattern in the first direction, and some of the remaining peripheral patterns of the touch cells in the first and second sub-edge areas extend from the central pattern in a direction opposite to the first direction.

In an embodiment, peripheral patterns of the touch cells in the third sub-edge area among the plurality of peripheral patterns extend from the central pattern in a direction opposite to the first direction.

In an embodiment, peripheral patterns of the touch cells in the fourth sub-edge area among the plurality of peripheral patterns extend from the central pattern in the first direction.

BRIEF DESCRIPTION OF THE DRAWINGS

The above and other features of the present disclosure will become more apparent by describing in detail embodiments thereof with reference to the accompanying drawings.

DETAILED DESCRIPTION OF THE EMBODIMENTS

Figure 1:
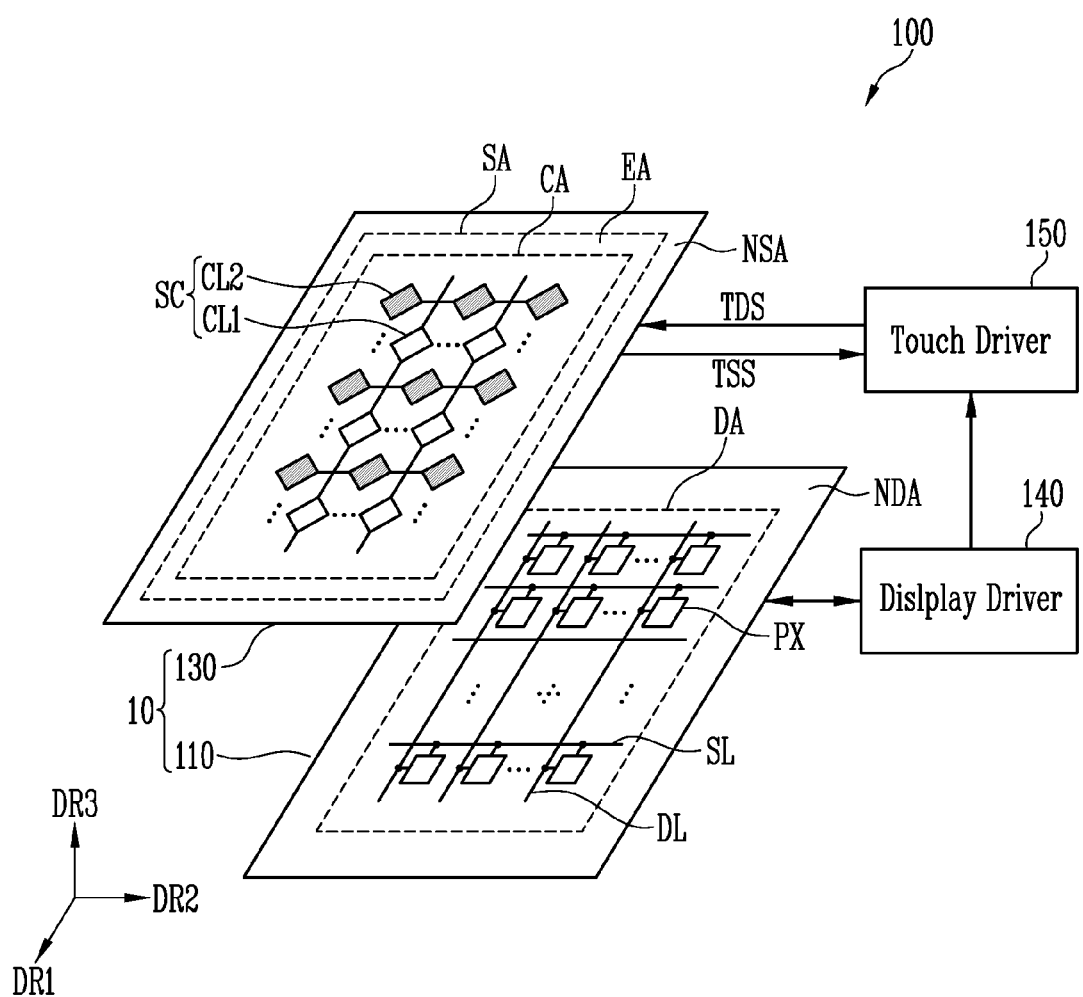
FIG. 1 is a block diagram illustrating a display device in accordance with an embodiment of the present disclosure.

Embodiments of the present disclosure will be described more fully hereinafter with reference to the accompanying drawings. Like reference numerals may refer to like elements throughout the accompanying drawings.

It will be understood that when a portion is referred to as being "connected to" another portion, it may be "directly connected to" the other portion or "indirectly connected to" the other portion with intervening portions therebetween. The terminology used herein is intended to describe specific embodiments and is not intended to limit the present disclosure. It will be understood that the terms "comprise," "include," or "have" as used herein specify the presence of stated elements, but do not preclude the presence or addition of one or more other elements. The expression "at least one of X, Y, and Z" may be interpreted as one X, one Y, one Z, or any combination of two or more of X, Y, and Z (e.g., XYZ, XYY, YZ, ZZ, etc.). The term "and/or" as used herein includes any combination of one or more of the elements.

It will be understood that although the terms such as "first," "second," etc. may be used to describe various elements, these elements should not be limited by these terms. These terms are only used to distinguish one element from another. Accordingly, a first element may be referred to as a second element without departing from the scope of the present disclosure.

Spatially relative terms such as "below," "above," etc. may be used for descriptive purposes, thereby describing the relationship between one element or feature and another element(s) or feature(s) as illustrated in the drawings. Spatially relative terms are intended to include different directions in use, operation, and/or manufacture, in addition to the directions depicted in the drawings. For example, when the device illustrated in the figures is turned over, elements depicted as being located "below" other elements or features are located "above" the other elements or features. Accordingly, in an embodiment, the term "below" may include both up and down directions. In addition, the device may be oriented in other directions (e.g., rotated by 90 degrees or in other orientations), and thus, the spatially relative terms as used herein should be interpreted accordingly.

Herein, when two or more elements or values are described as being substantially or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "substantially" and "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "substantially" and "about" may mean within one or more standard deviations as understood by one of the ordinary skill in the art.

FIG. 1 is a block diagram illustrating a display device in accordance with an embodiment of the present disclosure.

Referring to FIG. 1, a display device 100 may include a panel 10, a display driver 140 (also referred to as a display driver circuit), and a touch driver 150 (also referred to as a touch driver circuit).

The panel 10 may include a display panel 110 and a touch panel 130 that overlaps the display panel 110.

The display panel 110 may extend in a first direction DR1 and a second direction DR2 crossing the first direction DR1. The touch panel 130 may extend in the first direction DR1 and the second direction DR2.

In embodiments, the display panel 110 and the touch panel 130 may be manufactured separately from each other and then combined so that the display panel 110 and the touch panel 130 at least partially overlap each other. In embodiments, the display panel 110 and the touch panel 130 may be manufactured integrally as a single body. In this case, the touch panel 130 may be directly formed on at least one layer constituting the display panel 110 (for example, a thin-film encapsulation layer of the display panel 110).

The touch panel 130 is illustrated as being disposed in a third direction DR3 crossing the first direction DR1 and the second direction DR2 of the display panel 110, but the touch panel 130 is not limited thereto. For example, the touch panel 130 may be disposed below the display panel 110 in embodiments.

The display panel 110 may include a display area DA in which an image is displayed, and a non-display area NDA in which an image is not displayed disposed around the display area DA. The non-display area NDA may surround at least a portion of the display area DA. The display panel 110 may include a plurality of pixels PX formed on the substrate. The pixels PX may be disposed in the display area DA.

In embodiments, the display panel 110 may be a rigid substrate including a material such as, for example, glass or tempered glass. In embodiments, the display panel 110 may be a flexible substrate including a material such as, for example, plastic or metal.

The pixels PX may be connected (e.g., electrically connected) to driving lines SL and data lines DL. The pixels PX may be selected by a turn-on level scan signal supplied through the driving lines SL, and the selected pixels PX may receive a data signal through the data lines DL. The pixels PX may each emit light having a luminance corresponding to the received data signal. An image may be displayed in the display area DA by light emitted from the pixels PX.

Wirings connected to the pixels PX and/or at least one circuit constituting the display driver 140 may be disposed in the non-display area NDA. For example, a scan driver may be further disposed in the non-display area NDA.

In embodiments, the pixels PX included in the display panel 110 may include self-luminous devices. For example, the pixels PX may include one or more organic light-emitting diodes, may include one or more inorganic light-emitting diodes, or may include quantum dot/well light-emitting diodes. In embodiments, the display panel 110 may receive light from an external light source. For example, the display panel 110 may be implemented as a liquid crystal display panel. In this case, the display device 100 may further include a light source such as a backlight unit.

The touch panel 130 may include an active area SA capable of sensing a touch and a non-active area NSA disposed around the active area SA. The non-active area NSA may surround at least a portion of the active area SA. The active area SA may at least partially overlap the display area DA.

The touch panel 130 may include a substrate and touch cells formed on the substrate. Touch cells may be disposed in the active area SA on the substrate. For example, first cells CL1 and second cells CL2 may be disposed in a central area CA of the active area SA. Touch cells disposed in an edge area EA of the touch panel 130 will be described below with reference to FIG. 5.

In embodiments, the touch panel 130 may be a rigid substrate including a material such as, for example, glass or tempered glass. In embodiments, the touch panel 130 may be a flexible substrate including a material such as, for example, plastic or metal. In embodiments, at least one layer constituting the display panel 110 may be used as a substrate for the touch panel 130.

In embodiments, the display driver 140 and the touch driver 150 may include separate integrated chips (ICs). In embodiments, the display driver 140 and the touch driver 150 may be mounted within a single IC.

The display driver 140 may be electrically connected to the display panel 110 and may drive the pixels PX. For example, the display driver 140 may include a data driver connected to the data lines DL, a scan driver connected to the driving lines SL, and a timing controller that controls the data driver and the scan driver. The scan driver may be disposed in the non-display area NDA of the display panel 110. The display driver 140 may display an image on the display panel 110 in units of display frames.

The touch driver 150 may sense touch sensing signals TSS from the touch panel 130 while applying touch driving signals TDS to the touch panel 130. The touch driver 150 may sense a touch based on the touch sensing signals TSS. The touch driver 150 may sense a touch in units of sensing frames. The process in which the touch driver 150 senses the touch will be described in detail below with reference to FIG. 5.

Figure 2:
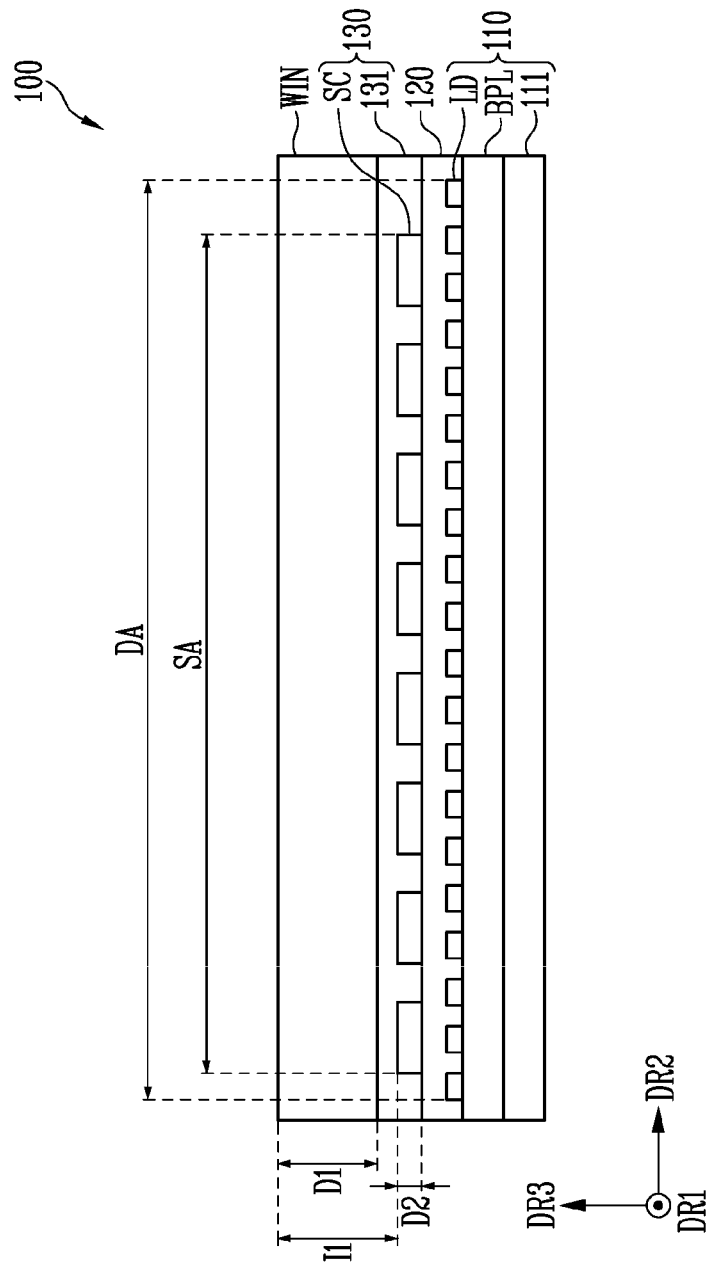
FIG. 2 is an example of a vertical cross-sectional view of a display area (DA) and an active area (SA) in the display device of FIG. 1.

FIG. 2 is an example of a vertical cross-sectional view of the display area DA and the active area SA in the display device of FIG. 1.

Referring to FIGS. 1 and 2, the touch panel 130 may be stacked on the display panel 110, and a window WIN may be stacked on the touch panel 130.

The display panel 110 may include a display substrate 111, a circuit element layer BPL formed on the display substrate 111, and light-emitting devices LD formed on the circuit element layer BPL. The circuit element layer BPL may include data lines and a pixel circuit (e.g., a transistor and a capacitor), and driving lines that drive the light-emitting devices LD of the pixels (see PX of FIG. 1).

An encapsulation film 120 covering the light-emitting devices LD may be further provided. In embodiments, the encapsulation film 120 may include at least one inorganic film and at least one organic film. With this configuration, the encapsulation film 120 may protect the light-emitting devices LD from the external environment (e.g., oxygen, moisture, etc.).

The touch panel 130 may include sensors SC formed on the display panel 110, and an insulating film 131 covering the sensors SC. The sensors SC may be provided in the first cells CL1 and the second cells CL2 of FIG. 1. Additionally, the sensors SC may be provided in the touch cells disposed in the edge area EA of the touch panel 130, and will be described below with reference to FIG. 5.

The sensors SC may have a second thickness D2.

The encapsulation film 120 may function as a sensor substrate that supports the touch panel 130. In an embodiment, a separate sensor substrate that supports the touch panel 130 may be provided separately from the encapsulation film 120.

The window WIN is a protection member disposed at the uppermost portion of the module of the display device 100 and may have transparency. For example, the window WIN may be transparent (or substantially transparent). The window WIN may have a multilayer structure including at least one of, for example, a glass substrate, a plastic film, and a plastic substrate. The window WIN may include a rigid or flexible substrate, and the constituent material of the window WIN is not particularly limited. The window WIN may have a first thickness D1 different from the second thickness D2 (e.g., larger than the second thickness D2).

In accordance with an embodiment, the display device 100 may further include a polarizer (or another type of anti-reflection layer) disposed between the window WIN and the touch panel 130, which may prevent the reflection of external light.

A gap between the top surface of the sensors SC and the top surface of the window WIN may be referred to as a first gap I1.

In a case in which the first thickness D1, which is the thickness of the window WIN, is constant, when the second thickness D2, which is the thickness of the sensors SC, increases, the first gap I1 may decrease. As the first gap I1 decreases, the touch input may reach the top surface of the sensors SC faster and more strongly, and touch sensitivity may be increased.

Similarly, in a case in which the second thickness D2, which is the thickness of the sensors SC, is constant, when the first thickness D1, which is the thickness of the widow WIN, decreases, the first gap I1 may decrease. As the first gap I1 decreases, the touch input may reach the top surface of the sensors SC faster and more strongly, and touch sensitivity may be increased.

Figure 3:
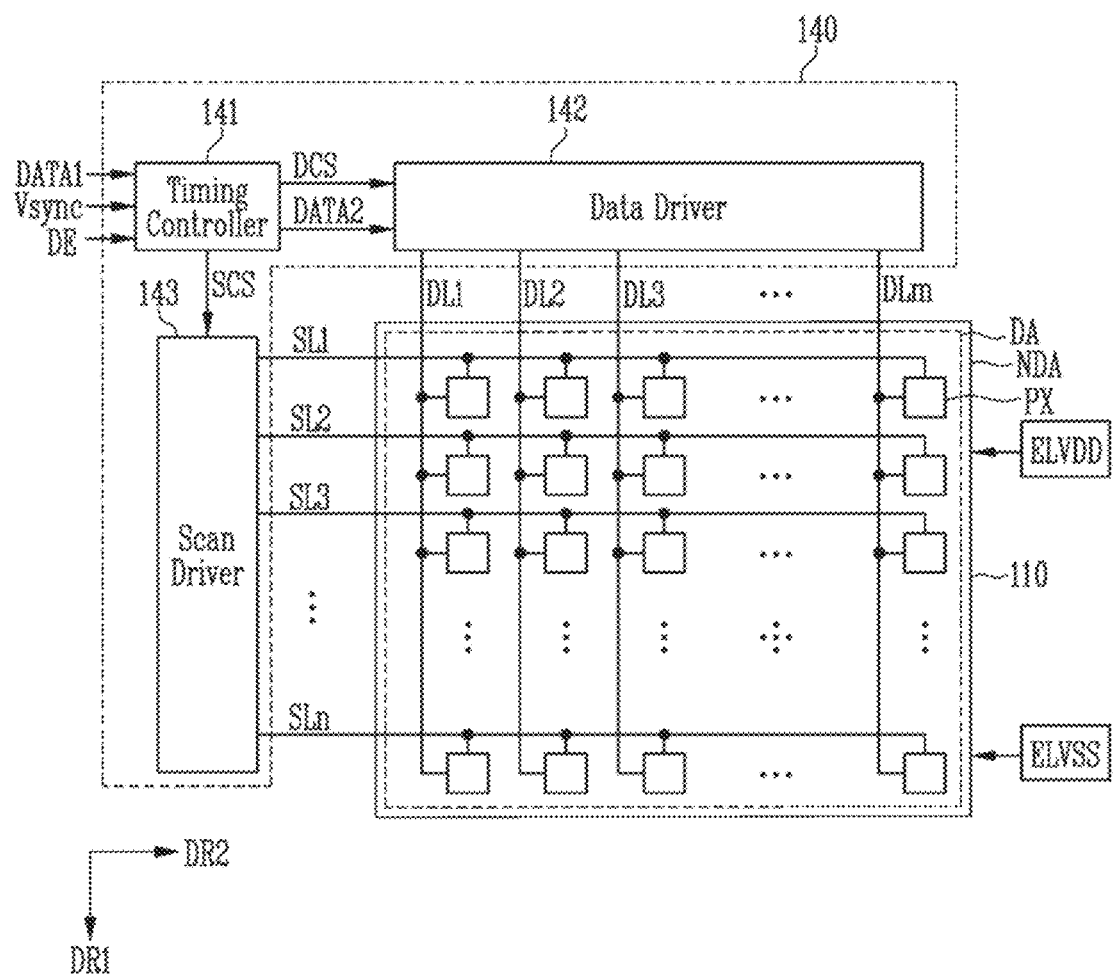
FIG. 3 is a block diagram illustrating an embodiment of a display panel and a display driver in FIG. 1.

FIG. 3 is a block diagram illustrating an embodiment of the display panel and the display driver in FIG. 1.

Referring to FIG. 3, the display device 100 may include the display panel 110 and the display driver 140.

The display panel 110 may include pixels PX, and data lines DL1 to DLm and driving lines SL1 to SLn connected to the pixels PX.

The display panel 110 may include a display area DA in which an image is displayed, and a non-display area NDA in which an image is not displayed disposed around the display area DA. The non-display area NDA may surround at least a portion of the display area DA.

The pixels PX may each be connected to a first power ELVDD and a second power ELVSS.

The pixels PX may each include a light-emitting element (see LD of FIG. 2). The pixels PX may adjust a current flowing from the first power ELVDD to the second power ELVSS via the light-emitting device according to data signals supplied through the corresponding data lines DL1 to DLm (where m is an integer greater than or equal to 2). The light-emitting element of each of the pixels PX may generate light according to the adjusted current. The first power ELVDD may be a high potential voltage. The second power ELVSS may be a low potential voltage.

The display driver 140 may include a timing controller 141, a data driver 142, and a scan driver 143.

Referring to FIG. 3, the timing controller 141 may receive a vertical synchronization signal Vsync, a data enable signal DE, and the like from outside of the timing controller 141. However, embodiments of the present disclosure are not limited thereto. For example, in accordance with an embodiment, the timing controller 141 may generate the vertical synchronization signal Vsync, the data enable signal DE, and the like, based on information included in external control signals. For convenience of explanation, an embodiment in which the timing controller 141 receives the vertical synchronization signal Vsync, the data enable signal DE, and the like from outside of the timing controller 141 will be described as an example, but embodiments of the present disclosure are not limited thereto.

The timing controller 141 may generate control signals that control the data driver 142 and the scan driver 143 in response to the external control signals (e.g., the data enable signal DE, the vertical synchronization signal Vsync, etc.). For example, the timing controller 141 may control the data driver 142 by outputting a data driver control signal DCS to the data driver 142 in response to the external control signals. The timing controller 141 may control the scan driver 143 by outputting a scan driver control signal SCS to the scan driver 143 in response to the external control signals.

The timing controller 141 may convert first image data DATA1 input from outside of the timing controller 141 according to an interface (e.g., a preset interface). For example, the timing controller 141 may convert second image data DATA2 suitable for driving the data driver 142 and supply the converted second image data DATA2 to the data driver 142. The first image data DATA1 may include luminance information for each of the pixels PX of the display panel 110. The first image data DATA1 may be divided in units of frames.

The data enable signal DE that the timing controller 141 receives from outside of the timing controller 141 may be a signal that defines a period during which data signals are input to the data lines DL1 to DLm.

The data driver 142 may generate data signals according to the data driver control signal DCS and the second image data DATA2 input from the timing controller 141. The data driver 142 may supply the generated data signals to the data lines DL1 to DLm.

For connection to the data lines DL1 to DLm, the data driver 142 may be mounted directly on the substrate on which the pixels PX are formed, or may be connected to the substrate on which the pixels PX are formed through a separate component such as a flexible circuit board.

The scan driver 143 may supply scan signals to the driving lines SL1 to SLn (where n is an integer greater than or equal to 1) according to the scan driver control signal SCS input from the timing controller 141. For example, the scan driver 143 may sequentially supply the scan signals to the driving lines SL1 to SLn.

The pixels PX connected to the driving lines SL1 to SLn to which a scan signal (e.g., a turn-on level scan signal) is supplied may receive data signals transmitted from the data lines DL1 to DLm. The pixels that receive the data signals may emit light having a luminance corresponding to the supplied data signals.

For connection to the driving lines SL1 to SLn, the scan driver 143 may be mounted directly on the substrate on which the pixels PX are formed. Alternatively, the scan driver 143 may be connected to the substrate on which the pixels PX are formed through a separate component such as a flexible circuit board.

In FIG. 3, the timing controller 141, the data driver 142, and the scan driver 143 are illustrated as separate components, but at least some of the components may be integrated in accordance with embodiments.

Figure 4:
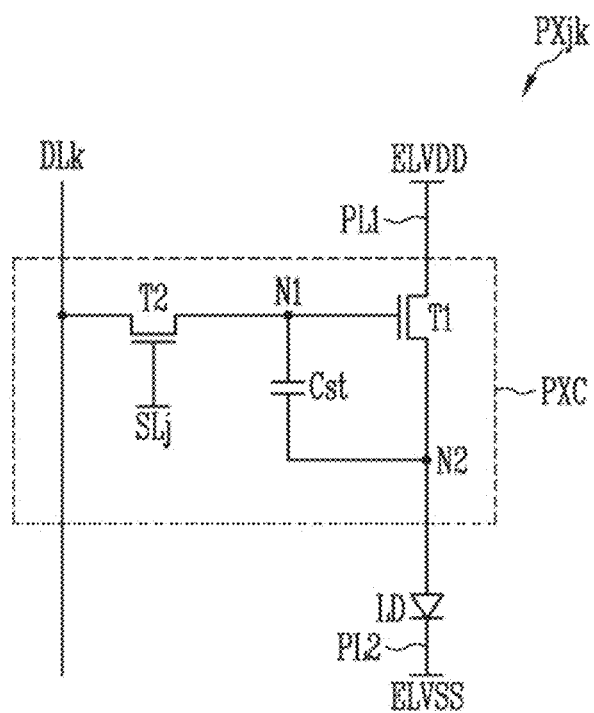
FIG. 4 is a circuit diagram illustrating an embodiment of one of pixels in FIG. 3.

FIG. 4 is a circuit diagram illustrating an embodiment of one of the pixels in FIG. 3.

In FIG. 4, a pixel PXjk included in a j-th pixel row (where j is an integer between 1 and n) and a k-th pixel column (where k is an integer between 1 and m) is illustrated as an example.

Referring to FIG. 4, the pixel PXjk may include a light-emitting device LD and a pixel circuit PXC configured to drive the light-emitting device LD. The pixel circuit PXC may include two or more switching elements (e.g., transistors) and one or more storage elements (e.g., capacitors). The pixel circuit PXC may include, for example, a first transistor T1 (or a driving transistor T1), a second transistor T2 (or a switching transistor T2), and a storage capacitor Cst.

The light-emitting device LD may generate light (e.g., light having a certain luminance) in response to the amount of current supplied from the pixel circuit PXC (e.g., the first transistor T1 of the pixel circuit PXC). The light-emitting device LD may include a first electrode and a second electrode. The first electrode of the light-emitting device LD may be connected to a second node N2. The second electrode of the light-emitting device LD may be connected to a second power line PL2. The second power ELVSS may be applied to the second power line PL2. In an embodiment, the first electrode may be an anode and the second electrode may be a cathode. In accordance with an embodiment, the first electrode may be a cathode and the second electrode may be an anode.

The first electrode of the first transistor T1 may be connected to the first power line PL1. The first power ELVDD may be applied to the first power line PL1. The second electrode of the first transistor T1 may be connected to the first electrode (or the second node N2) of the light-emitting device LD. The gate electrode of the first transistor T1 may be connected to the first node N1. In an embodiment, the first electrode may be a drain electrode and the second electrode may be a source electrode. In an embodiment, the second electrode may be a source electrode and the second electrode may be a drain electrode.

The first transistor T1 may control the amount of current flowing to the light-emitting device LD in response to the voltage of the first node N1. At this time, the first transistor T1 may be turned on when a voltage (e.g., a gate-source voltage) between the first node N1 and the second node N2 is higher than a threshold voltage.

The first electrode of the second transistor T2 may be connected to a k-th data line DLk, and the second electrode of the second transistor T2 may be connected to the first node N1 (or a gate electrode of the first transistor T1). A gate electrode of the second transistor T2 may be connected to a j-th driving line SLj. The second transistor T2 may be turned on when the scan signal (e.g., the scan signal of the high level voltage) is supplied to the j-th driving line SLj, and may transmit the data voltage from the k-th data line DLk to the first node N1.

The storage capacitor Cst is connected between the first node N1 and the second node N2. The storage capacitor Cst may be charged with a data voltage corresponding to the data signal supplied to the first node N1 during one frame. Accordingly, the storage capacitor Cst may store a voltage corresponding to the voltage difference between the first node N1 and the second node N2. The first transistor T1 may be turned on or turned off in response to the voltage stored in the storage capacitor Cst.

According to embodiments of the present disclosure, the circuit structure of the pixels PX is not limited to FIG. 4. For example, the light-emitting device LD may be located between the first power line PL1 connected to the first power ELVDD and the first electrode of the first transistor T1.

In FIG. 4, the transistor is illustrated as being an n-channel MOS (NMOS) transistor, but the present disclosure is not limited thereto. For example, at least one of the first and second transistors T1 and T2 may be implemented as a p-channel MOS (PMOS) transistor. In addition, the first and second transistors T1 and T2 illustrated in FIG. 4 may be transistors including at least one of, for example, an oxide semiconductor, an amorphous silicon semiconductor, and a polycrystalline silicon semiconductor.

Only the first and second transistors T1 and T2 and the storage capacitor Cst are illustrated in FIG. 4, but the number of transistors and capacitors included in the pixel circuit PXC is not limited thereto. As an example, the pixel circuit PXC may additionally include additional transistors and/or capacitors not illustrated in FIG. 4.

Figure 5:
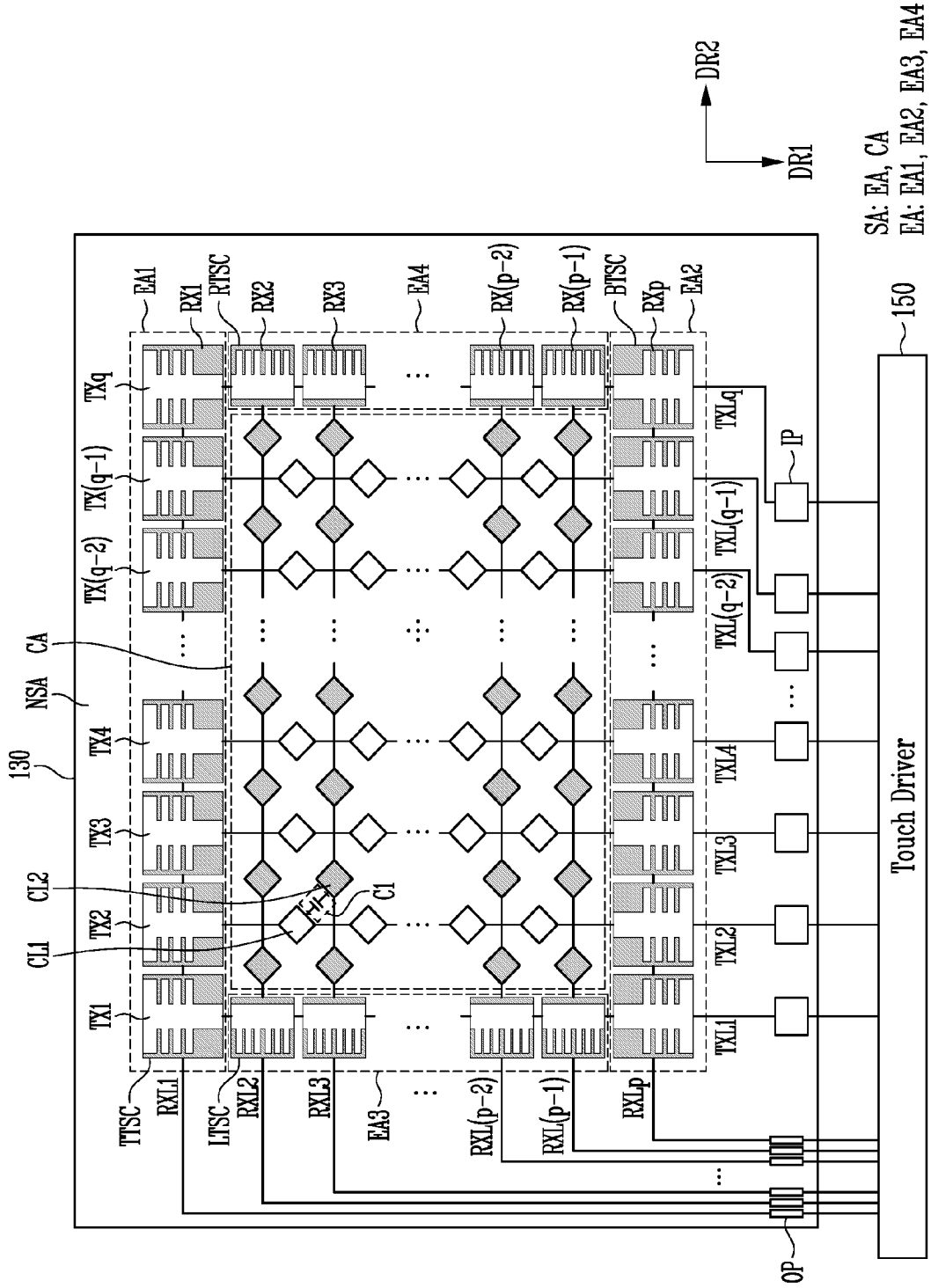
FIG. 5 is a block diagram illustrating an embodiment of the touch panel and the touch driver in FIG. 1.

FIG. 5 is a block diagram illustrating an embodiment of the touch panel and the touch driver in FIG. 1.

Referring to FIGS. 1 and 5, the touch panel 130 may include an active area SA capable of sensing a touch and a non-active area NSA disposed around the active area SA. The non-active area NSA may surround at least a portion of the active area SA.

The active area SA of the touch panel 130 may include a central area CA and an edge area EA.

First to q-th driving electrodes TX1 to TXq (where q is an integer greater than or equal to 1) and first to p-th sensing electrodes RX1 to RXp (where p is an integer greater than or equal to 1) may be disposed in the active area SA of the touch panel 130. The first to q-th driving electrodes TX1 to TXq may be connected to the first to q-th driving lines TXL1 to TXLq, respectively. The first to p-th sensing electrodes RX1 to RXp may be connected to the first to p-th sensing lines RXL1 to RXLp, respectively.

The first to q-th driving electrodes TX1 to TXq may include first cells CL1 in the central area CA of the touch panel 130, respectively. The first cells CL1 may be arranged in the first direction DR1 and may be electrically connected to each other. In FIG. 5, each of the first cells CL1 is illustrated as having a diamond shape. However, embodiments of the present disclosure are not limited thereto. For example, the first cells CL1 may each have at least one of various shapes, such as a circular shape, a rectangular shape, a triangular shape, or a mesh shape. The first cells CL1 may include a single layer or multiple layers. The first cells CL1 may have conductivity by including at least one of various conductive materials, such as, for example, a metal material and a transparent conductive material. For example, the first cells CL1 may each include at least one of various metal materials, such as gold (Au), silver (Ag), aluminum (Al), molybdenum (Mo), chromium (Cr), titanium (Ti), nickel (Ni), neodymium (Nd), copper (Cu), and platinum (Pt), or any alloy thereof.

The first to p-th electrodes RX1 to RXp may include second cells CL2 in the central area CA of the touch panel 130, respectively. The second cells CL2 may be arranged in the second direction DR2 and may be electrically connected to each other. In FIG. 5, each of the second cells CL2 is illustrated as having a diamond shape. However, embodiments of the present disclosure are not limited thereto. For example, the second cells CL2 may each have at least one of various shapes, such as a circular shape, a rectangular shape, a triangular shape, or a mesh shape. The second cells CL2 may include a single layer or multiple layers. The second cells CL2 may have conductivity by including at least one of various conductive materials, such as, for example, a metal material and a transparent conductive material. For example, the second cells CL2 may each include at least one of various metal materials, such as gold (Au), silver (Ag), aluminum (Al), molybdenum (Mo), chromium (Cr), titanium (Ti), nickel (Ni), neodymium (Nd), copper (Cu), and platinum (Pt), or any alloy thereof.

The edge area EA may include a first edge area EA1, a second edge area EA2, a third edge area EA3, and a fourth edge area EA4.

Top tree structure cells TTSC, bottom tree structure cells BTSC, left tree structure cells LTSC, and right tree structure cells RTSC may be arranged in the edge area EA of the touch panel 130. The arrangement positions and arrangement directions of the components according to embodiments of the present disclosure are as follows.

The plurality of top tree structure cells TTSC may be arranged in the first edge area EA1 of the touch panel 130. The plurality of top tree structure cells TTSC may be arranged in the second direction DR2 and may be electrically connected to each other.

The plurality of bottom tree structure cells BTSC may be arranged in the second edge area EA2 of the touch panel 130. The plurality of lower tree structure cells BTSC may be arranged in the second direction DR2 and may be electrically connected to each other.

The plurality of left tree structure cells LTSC may be arranged in the third edge area EA3 of the touch panel 130. The plurality of left tree structure cells LTSC may be arranged in the first direction DR1 and may be electrically connected to each other.

The plurality of right tree structure cells RTSC may be arranged in the fourth edge area EA4 of the touch panel 130. The plurality of right tree structure cells RTSC may be arranged in the first direction DR1 and may be electrically connected to each other.

The top tree structure cells TTSC may each include a portion constituting the first sensing electrode RX1 and a portion constituting one of the first to q-th driving electrodes TX1 to TXq.

The lower tree structure cells BTSC may each include a portion constituting the p-th sensing electrodes RXp and a portion constituting one of the first to q-th driving electrodes TX1 to TXq.

The left tree structure cells LTSC may each include a portion constituting one of the second to p-1-th sensing electrodes RX1 to RX(p-1) and the first driving electrode TX1.

The right tree structure cells RTSC may each include a portion constituting one of the second to p-1-th sensing electrodes RX1 to RX(p-1) and the q-th driving electrode TXq.

The shapes of the top tree structure cells TTSC may be different from the shapes of the first cells CL1 and the second cells CL2. The shapes of the lower tree structure cells BTSC may be different from the shapes of the first cells CL1 and the second cells CL2. The shapes of the left tree structure cells LTSC may be different from the shapes of the first cells CL1 and the second cells CL2. The shapes of the right tree structure cells RTSC may be different from the shapes of the first cells CL1 and the second cells CL2. The shapes of the top tree structure cells TTSC, the bottom tree structure cells BTSC, the left tree structure cells LTSC, and the right tree structure cells RTSC will be described in detail below with reference to FIGS. 6 to 9.

The top tree structure cells TTSC, the bottom tree structure cells BTSC, the left tree structure cells LTSC, and the right tree structure cells RTSC may have conductivity by including at least one of various conductive materials, such as, for example, a metal material and a transparent conductive material. For example, the top tree structure cells TTSC, the bottom tree structure cells BTSC, the left tree structure cells LTSC, and the right tree structure cells RTSC may each include at least one of various metal materials, such as gold (Au), silver (Ag), aluminum (Al), molybdenum (Mo), chromium (Cr), titanium (Ti), nickel (Ni), neodymium (Nd), copper (Cu), and platinum (Pt), or any alloy thereof.

The touch panel 130 may further include input pads IP connected to the first to q-th driving lines TXL1 to TXLq. The touch driver 150 may be connected to the first to q-th driving lines TXL1 to TXLq through the input pads IP.

The touch panel 130 may further include output pads OP connected to the first to p-th sensing lines RXL1 to RXLp. The touch driver 150 may be connected to the first to p-th sensing lines RXL1 to RXLp through the output pads OP.

In the central area CA of the touch panel 130, the first cells CL1 and the second cells CL2 may form mutual capacitances. For example, a first capacitance C1 may be formed between one of the first cells CL1 and one of the second cells CL2.

The top tree structure cells TTSC, the bottom tree structure cells BTSC, the left tree structure cells LTSC, and the right tree structure cells RTSC, which are arranged in the edge area EA of the touch panel 130, may also form mutual capacitances.

When a touch (e.g., at least one of various types of inputs that cause a change in mutual capacitance, such as physical contact, hovering, etc.) is provided to the touch panel 130, one or more of the mutual capacitances may change.

The touch driver 150 may sense the touch sensing signals (see TSS of FIG. 1) from the first to p-th sensing electrodes RX1 to RXp through the first to p-th sensing lines RXL1 to RXLp while applying the touch driving signals (see TDS of FIG. 1) to the first to q-th driving electrodes TX1 to TXq through the first to q-th driving lines TXL1 to TXLq. The touch driver 150 may sense a change in mutual capacitance based on touch sensing signals TSS. The touch driver 150 may recognize a touch by sensing a change in mutual capacitance.

Figure 6:
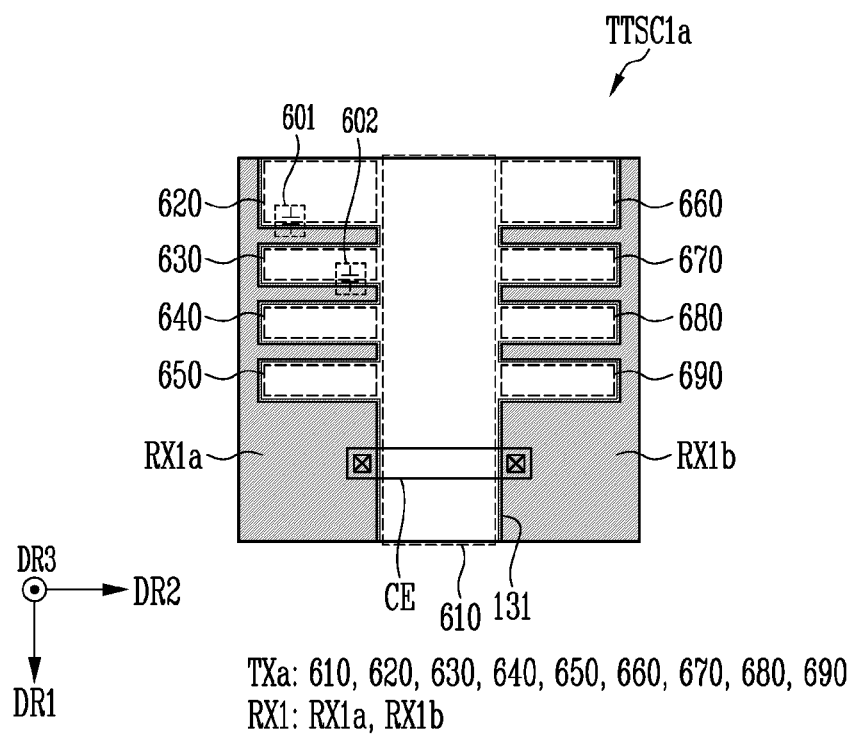
FIG. 6 is a diagram illustrating in more detail a top tree structure cell (TTSC1a) that is one of a plurality of top tree structure cells (TTSC) in FIG. 5.

FIG. 6 is a diagram illustrating in more detail a top tree structure cell TTSC1a that is one of a plurality of top tree structure cells TTSC in FIG. 5.

An embodiment of the present disclosure will be described below with reference to the top tree structure cell TTSC1a exemplarily illustrated in FIG. 6.

Referring to FIGS. 5 and 6, the top tree structure cell TTSC1a (where a is an integer between 1 and q) may include a portion of a first sensing electrode RX1 and a portion of an a-th driving electrode TXa.

An insulating film 131 may be disposed between the first sensing electrode RX1 and the a-th driving electrode TXa constituting the top tree structure cell TTSC1a. The first sensing electrode RX1 and the a-th driving electrode TXa constituting the top tree structure cell TTSC1a may be spaced apart from each other in the first direction DR1 and/or the second direction DR2 with the insulating film 131 disposed therebetween.

The top tree structure cell TTSC1a may include a connection electrode CE. The connection electrode CE may overlap the a-th driving electrode TXa in the third direction DR3. The connection electrode CE may electrically connect portions RX1a and RX1b of the first sensing electrode RX1 that are spaced apart from each other in the second direction DR2 with the a-th driving electrode TXa disposed therebetween. The shape of the connection electrode CE is not limited to that illustrated in FIG. 6.

The a-th driving electrode TXa may be formed by a first pattern 610 extending in the first direction DR1 and second to ninth patterns 620 to 690 extending from the first pattern 610 in the second direction DR2 or in a direction opposite to the second direction DR2.

Although FIG. 6 illustrates eight patterns extending from the first pattern 610 in the second direction DR2 or in a direction opposite to the second direction DR2, the present disclosure is not limited thereto. For example, there may be more than or fewer than eight patterns extending from the first pattern 610 in the second direction DR2 or in a direction opposite to the second direction DR2 according to embodiments of the present disclosure.

The first pattern 610 may have a rectangular shape in which the length of the side extending in the first direction DR1 is longer than the length of the side extending in the second direction DR2.

The second to ninth patterns 620 to 690 may each have a rectangular shape in which the length of the side extending in the first direction DR1 is shorter than the length of the side extending in the second direction DR2.

The lengths of the sides of the second and sixth patterns 620 and 660 in the first direction DR1 may be equal to (or substantially equal to) each other. The lengths of the sides of the second and sixth patterns 620 and 660 in the second direction DR2 may be equal to (or substantially equal to) each other.

The lengths of the sides of the third and seventh patterns 630 and 670 extending in the first direction DR1 may be equal to (or substantially equal to) each other. The lengths of the sides of the third and seventh patterns 630 and 670 extending in the second direction DR2 may be equal to (or substantially equal to) each other.

The lengths of the sides of the fourth and eighth patterns 640 and 680 extending in the first direction DR1 may be equal to (or substantially equal to) each other. The lengths of the sides of the fourth and eighth patterns 640 and 680 extending in the second direction DR2 may be equal to (or substantially equal to) each other.

The lengths of the sides of the fifth and ninth patterns 650 and 690 extending in the first direction DR1 may be equal to (or substantially equal to) each other. The lengths of the sides of the fifth and ninth patterns 650 and 690 extending in the second direction DR2 may be equal to (or substantially equal to) each other.

The lengths of the sides of the second and sixth patterns 620 and 660 extending in the first direction DR1 may be longer than the lengths of the sides of the third pattern 630, the fourth pattern 640, the fifth pattern 650, the seventh pattern 670, the eighth pattern 680, and the ninth pattern 690 extending in the first direction DR1.

The second to ninth patterns 620 to 690 may extend from the first pattern 610. For example, the second to fifth patterns 620 to 650 may extend from the first pattern 610 in a direction opposite to the second direction DR2. The sixth to ninth patterns 660 to 690 may extend from the first pattern 610 in the second direction DR2.

The second to fifth patterns 620 to 650 may be spaced apart from each other in the first direction DR1. The sixth to ninth patterns 660 to 690 may be spaced apart from each other in the first direction DR1.

Mutual capacitances may be formed between the a-th driving electrode TXa and the first sensing electrode RX1 surrounding the a-th driving electrode TXa. For example, a mutual capacitance 601 may be formed between the second pattern 620 of the a-th driving electrode TXa and the first sensing electrode RX1 surrounding the second pattern 620. A mutual capacitance 602 may be formed between the third pattern 630 of the a-th driving electrode TXa and the first sensing electrode RX1 surrounding the third pattern 630. FIG. 6 illustrates only some of the plurality of mutual capacitances.

When a touch is provided to the top tree structure cell TTSC1a, one or more of the mutual capacitances may change.

The touch driver 150 may sense the touch sensing signals (see TSS of FIG. 1) from the first to p-th sensing electrodes RX1 to RXp through the first to p-th sensing lines RXL1 to RXLp while applying the touch driving signals (see TDS of FIG. 1) to the first to q-th driving electrodes TX1 to TXq through the first to q-th driving lines TXL1 to TXLq. The touch driver 150 may sense a change in mutual capacitance based on touch sensing signals (see TSS of FIG. 1). The touch driver 150 may recognize a touch by sensing a change in mutual capacitance.

Figure 7:
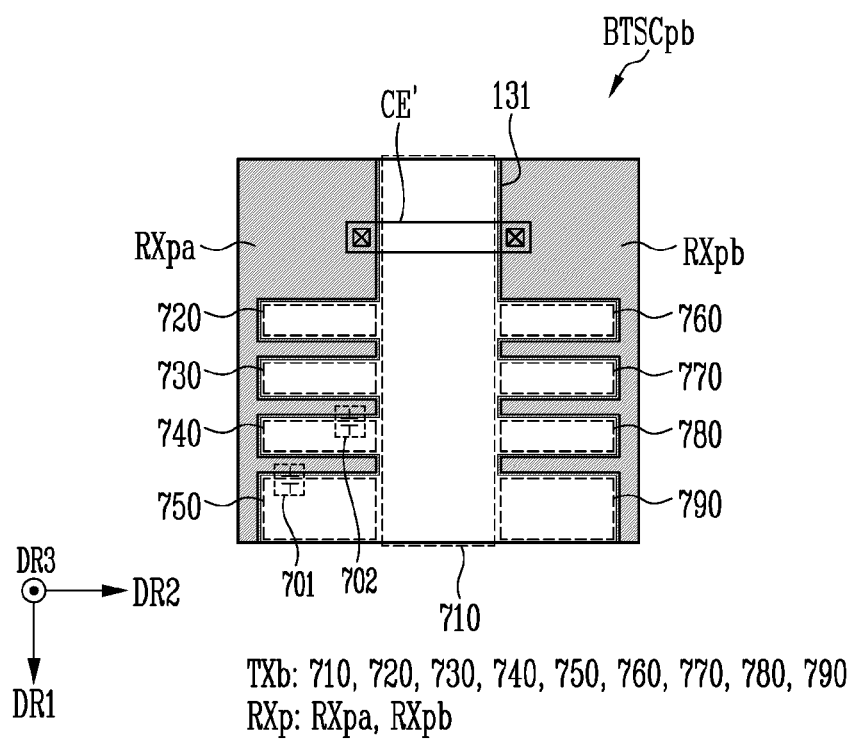
FIG. 7 is a diagram illustrating in more detail a bottom tree structure cell (BTSCpb) that is one of a plurality of bottom tree structure cells (BTSC) in FIG. 5.

FIG. 7 is a diagram illustrating in more detail a bottom tree structure cell BTSCpb that is one of the plurality of bottom tree structure cells BTSC in FIG. 5.

An embodiment of the present disclosure will be described below with reference to the bottom tree structure cell BTSCpb exemplarily illustrated in FIG. 7.

Referring to FIGS. 5 and 7, the bottom tree structure cell BTSCpb (where b is an integer between 1 and q) may include a portion of a p-th sensing electrode RXp and a portion of a b-th driving electrode TXb.

An insulating film 131 may be disposed between the p-th sensing electrode RXp and the b-th driving electrode TXb constituting the bottom tree structure cell BTSCpb. The p-th sensing electrode RXp and the b-th driving electrode TXb constituting the bottom tree structure cell BTSCpb may be spaced apart from each other in the first direction DR1 and/or the second direction DR2 with the insulating film 131 disposed therebetween.

The bottom tree structure cell BTSCpb may include a connection electrode CE". The connection electrode CE' may overlap the b-th driving electrode TXb in the third direction DR3. The connection electrode CE' may electrically connect portions RXpa and RXpb of the p-th sensing electrode RXp that are spaced apart from each other in the second direction DR2 with the b-th driving electrode TXb disposed therebetween. The shape of the connection electrode CE' is not limited to that illustrated in FIG. 7.

The b-th driving electrode TXb may be formed by a first pattern 710 extending in the first direction DR1 and second to ninth patterns 720 to 790 extending from the first pattern 710 in the second direction DR2 or in a direction opposite to the second direction DR2.

Although FIG. 7 illustrates eight patterns extending from the first pattern 710 in the second direction DR2 or in a direction opposite to the second direction DR2, the present disclosure is not limited thereto. For example, there may be more than or fewer than eight patterns extending from the first pattern 710 in the second direction DR2 or in a direction opposite to the second direction DR2 according to embodiments of the present disclosure.

The first pattern 710 may have a rectangular shape in which the length of the side extending in the first direction DR1 is longer than the length of the side extending in the second direction DR2.

The second to ninth patterns 720 to 790 may have a rectangular shape in which the length of the side extending in the first direction DR1 is shorter than the length of the side extending in the second direction DR2.

The lengths of the sides of the second and sixth patterns 720 and 760 extending in the first direction DR1 may be equal to (or substantially equal to) each other. The lengths of the sides of the second and sixth patterns 720 and 760 extending in the second direction DR2 may be equal to (or substantially equal to) each other.

The lengths of the sides of the third and seventh patterns 730 and 770 extending in the first direction DR1 may be equal to (or substantially equal to) each other. The lengths of the sides of the third and seventh patterns 730 and 770 extending in the second direction DR2 may be equal to (or substantially equal to) each other.

The lengths of the sides of the fourth and eighth patterns 740 and 780 extending in the first direction DR1 may be equal to (or substantially equal to) each other. The lengths of the sides of the fourth and eighth patterns 740 and 780 extending in the second direction DR2 may be equal to (or substantially equal to) each other.

The lengths of the sides of the fifth and ninth patterns 750 and 790 extending in the first direction DR1 may be equal to (or substantially equal to) each other. The lengths of the sides of the fifth and ninth patterns 750 and 790 extending in the second direction DR2 may be equal to (or substantially equal to) each other.

The lengths of the sides of the fifth and ninth patterns 750 and 790 extending in the first direction DR1 may be longer than the lengths of the sides of the second pattern 720, the third pattern 730, the fourth pattern 740, the sixth pattern 760, the seventh pattern 770, and the eighth pattern 780 extending in the first direction DR1.

The second to ninth patterns 720 to 790 may extend from the first pattern 710. For example, the second to fifth patterns 720 to 750 may extend from the first pattern 710 in a direction opposite to the second direction DR2. The sixth to ninth patterns 760 to 790 may extend from the first pattern 710 in the second direction DR2.

The second to fifth patterns 720 to 750 may be spaced apart from each other in the first direction DR1. The sixth to ninth patterns 760 to 790 may be spaced apart from each other in the first direction DR1.

Mutual capacitances may be formed between the b-th driving electrode TXb and the p-th sensing electrode RXp surrounding the b-th driving electrode TXb. For example, a mutual capacitance 701 may be formed between the fifth pattern 750 of the b-th driving electrode TXb and the p-th sensing electrode RXp surrounding the fifth pattern 750. A mutual capacitance 702 may be formed between the fourth pattern 740 of the b-th driving electrode TXb and the p-th sensing electrode RXp surrounding the fourth pattern 740. FIG. 7 illustrates only some of the plurality of mutual capacitances.

When a touch is provided to the bottom tree structure cell BTSCpb, one or more of the mutual capacitances may change.

The touch driver 150 may sense the touch sensing signals (see TSS of FIG. 1) from the first to p-th sensing electrodes RX1 to RXp through the first to p-th sensing lines RXL1 to RXLp while applying the touch driving signals (see TDS of FIG. 1) to the first to q-th driving electrodes TX1 to TXq through the first to q-th driving lines TXL1 to TXLq. The touch driver 150 may sense a change in mutual capacitance based on touch sensing signals (see TSS of FIG. 1). The touch driver 150 may recognize a touch by sensing a change in mutual capacitance.

Figure 8:
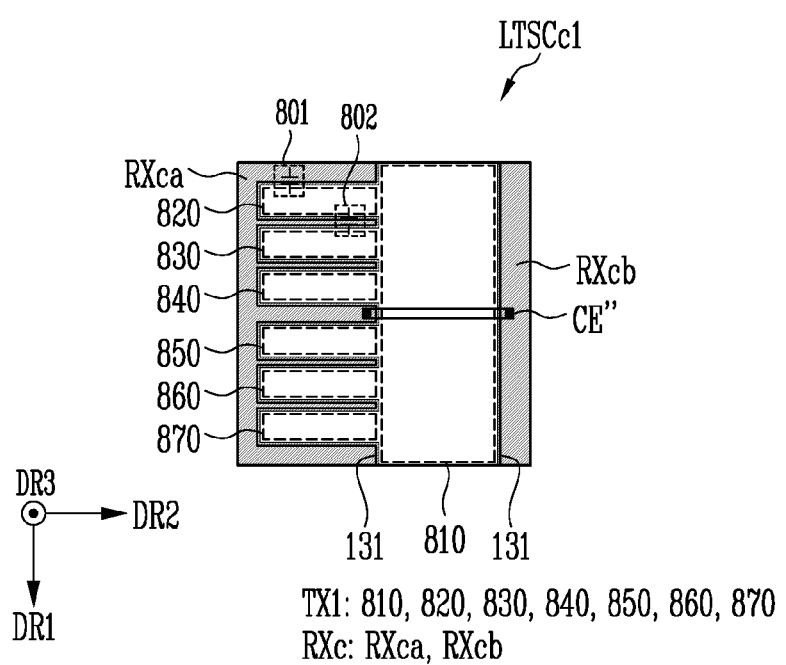
FIG. 8 is a diagram illustrating in more detail a left tree structure cell (LTSCc1) that is one of a plurality of left tree structure cells (LTSC) in FIG. 5.

FIG. 8 is a diagram illustrating in more detail a left tree structure cell LTSCc1 that is one of the plurality of left tree structure cells LTSC in FIG. 5.

An embodiment of the present disclosure will be described below with reference to the left tree structure cell LTSCc1 exemplarily illustrated in FIG. 8.

Referring to FIGS. 5 and 8, the left tree structure cell LTSCc1 (where c is an integer between 1 and p) may include a portion of the c-th sensing electrode RXc and a portion of the first driving electrode TX1.

An insulating film 131 may be disposed between the c-th sensing electrode RXc and the first driving electrode TX1 constituting the left tree structure cell LTSCc1. The c-th sensing electrode RXc and the first driving electrode TX1 constituting the left tree structure cell LTSCc1 may be spaced apart from each other in the first direction DR1 and/or the second direction DR2 with the insulating film 131 disposed therebetween.

The left tree structure cell LTSCc1 may include a connection electrode CE". The connection electrode CE" may overlap the first driving electrode TX1 in the third direction DR3. The connection electrode CE" may electrically connect portions RXca and RXcb of the c-th sensing electrode RXc spaced apart from each other in the second direction DR2 with the first driving electrode TX1 disposed therebetween. The shape of the connection electrode CE" is not limited to that illustrated in FIG. 8.

The first driving electrode TX1 may be formed by a first pattern 810 extending in the first direction DR1 and second to seventh patterns 820 to 870 extending from the first pattern 810 in a direction opposite to the second direction DR2.

Although FIG. 8 illustrates six patterns extending from the first pattern 810 in a direction opposite to the second direction DR2, the present disclosure is not limited thereto. For example, there may be more than or fewer than six patterns extending from the first pattern 810 in a direction opposite to the second direction DR2 according to embodiments of the present disclosure.

The first pattern 810 may have a rectangular shape in which the length of the side in the first direction DR1 is longer than the length of the side in the second direction DR2.

The second to seventh patterns 820 to 870 may each have a rectangular shape in which the length of the side extending in the first direction DR1 is shorter than the length of the side extending in the second direction DR2.

The lengths of the sides of the second to seventh patterns 820 to 870 extending in the first direction DR1 may be equal to (or substantially equal to) each other. The lengths of the sides of the second to seventh patterns 820 to 870 extending in the second direction DR2 may be equal to (or substantially equal to) each other.

The second to seventh patterns 820 to 870 may be spaced apart from each other in the first direction DR1.

Mutual capacitances may be formed between the first driving electrode TX1 and the c-th sensing electrode RXc surrounding the first driving electrode TX1. For example, a mutual capacitance 801 may be formed between the second pattern 820 of the first driving electrode TX1 and the c-th sensing electrode RXc surrounding the second pattern 820. A mutual capacitance 802 may be formed between the third pattern 830 of the first driving electrode TX1 and the c-th sensing electrode RXc surrounding the third pattern 830. FIG. 8 illustrates only some of the plurality of mutual capacitances.

When a touch is provided to the left tree structure cell LTSCc1, one or more of the mutual capacitances may change.

The touch driver 150 may sense the touch sensing signals (see TSS of FIG. 1) from the first to p-th sensing electrodes RX1 to RXp through the first to p-th sensing lines RXL1 to RXLp while applying the touch driving signals (see TDS of FIG. 1) to the first to q-th driving electrodes TX1 to TXq through the first to q-th driving lines TXL1 to TXLq. The touch driver 150 may sense a change in mutual capacitance based on touch sensing signals (see TSS of FIG. 1). The touch driver 150 may recognize a touch by sensing a change in mutual capacitance.

Figure 9:
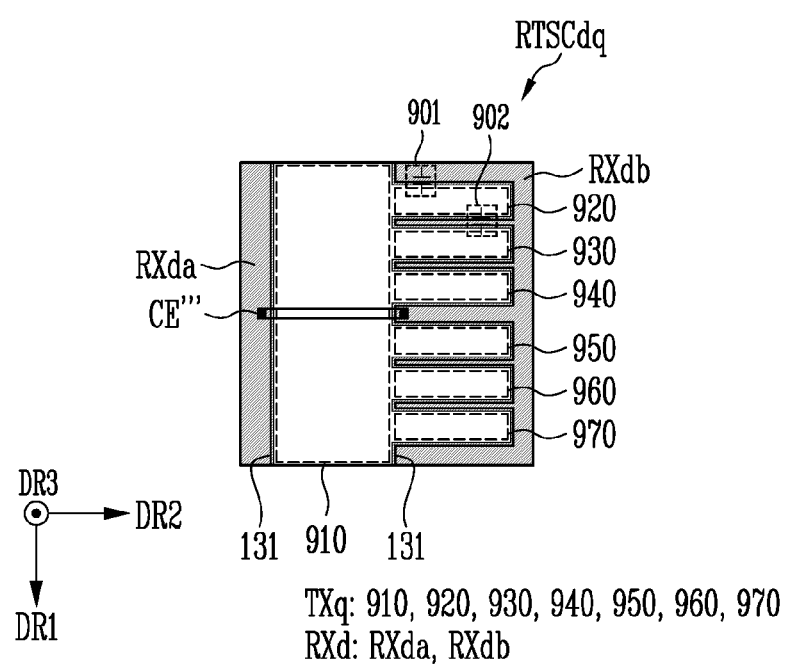
FIG. 9 is a diagram illustrating in more detail a right tree structure cell (RTSCdq) that is one of a plurality of right tree structure cells (RTSC) in FIG. 5.

FIG. 9 is a diagram illustrating in more detail a right tree structure cell RTSCdq that is one of the plurality of right tree structure cells RTSC in FIG. 5.

An embodiment of the present disclosure will be described below with reference to the right tree structure cell RTSCdq exemplarily illustrated in FIG. 9.

Referring to FIGS. 5 and 9, the right tree structure cell RTSCdq (where d is an integer between 1 and p) may include a portion of a d-th sensing electrode RXd and a portion of a q-th driving electrode TXq.

An insulating film 131 may be disposed between the d-th sensing electrode RXd and the q-th driving electrode TXq constituting the right tree structure cell RTSCdq. The d-th sensing electrode RXd and the q-th driving electrode TXq constituting the right tree structure cell RTSCdq may be spaced apart from each other in the first direction DR1 and/or the second direction DR2 with the insulating film 131 disposed therebetween.

The right tree structure cell RTSCdq may include a connection electrode CE'''. The connection electrode CE''' may overlap the q-th driving electrode TXq in the third direction DR3. The connection electrode CE'' may electrically connect portions RXda and RXdb of the d-th sensing electrode RXd that are spaced apart from each other in the second direction DR2 with the q-th driving electrode TXq disposed therebetween. The shape of the connection electrode CE'' is not limited to that illustrated in FIG. 9.

The q-th driving electrode TXq may be formed by a first pattern 910 extending in the first direction DR1 and second to seventh patterns 920 to 970 extending from the first pattern 910 in a direction opposite to the second direction DR2.

Although FIG. 9 illustrates six patterns extending from the first pattern 910 in a direction opposite to the second direction DR2, the present disclosure is not limited thereto. For example, there may be more than or fewer than six patterns extending from the first pattern 910 in a direction opposite to the second direction DR2 according to embodiments of the present disclosure.

The first pattern 910 may have a rectangular shape in which the length of the side extending in the first direction DR1 is longer than the length of the side extending in the second direction DR2.

The second to seventh patterns 920 to 970 may each have a rectangular shape in which the length of the side extending in the first direction DR1 is shorter than the length of the side extending in the second direction DR2.

The lengths of the sides of the second to seventh patterns 920 to 970 extending in the first direction DR1 may be equal to (or substantially equal to) each other. The lengths of the sides of the second to seventh patterns 920 to 970 in the second direction DR2 may be equal to (or substantially equal to) each other.

The second to seventh patterns 920 to 970 may be spaced apart from each other in the first direction DR1.

Mutual capacitances may be formed between the q-th driving electrode TXq and the d-th sensing electrode RXd surrounding the q-th driving electrode TXq. For example, a mutual capacitance 901 may be formed between the second pattern 920 of the q-th driving electrode TXq and the d-th sensing electrode RXd surrounding the second pattern 920. A mutual capacitance 902 may be formed between the third pattern 930 of the first driving electrode TX1 and the d-th sensing electrode RXd surrounding the third pattern 930. FIG. 9 illustrates only some of the plurality of mutual capacitances.

When a touch is provided to the right tree structure cell RTSCdq, one or more of the mutual capacitances may change.

The touch driver 150 may sense the touch sensing signals (see TSS of FIG. 1) from the first to p-th sensing electrodes RX1 to RXp through the first to p-th sensing lines RXL1 to RXLp while applying the touch driving signals (see TDS of FIG. 1) to the first to q-th driving electrodes TX1 to TXq through the first to q-th driving lines TXL1 to TXLq. The touch driver 150 may sense a change in mutual capacitance based on touch sensing signals (see TSS of FIG. 1). The touch driver 150 may recognize a touch by sensing a change in mutual capacitance.

Embodiments of the present disclosure have an effect of providing a touch panel with uniform touch input sensitivity regardless of the position on the touch panel, and a display device including the same.

Compared to a comparative example, in which touch sensitivity may be low in the edge area of a touch panel where touch sensors are not physically sufficiently disposed, embodiments of the present application may provide a touch panel having increased touch sensitivity in the edge area.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Effects in accordance with embodiments of the present disclosure are not limited by the description presented above, and various additional effects may also be provided.

In accordance with an embodiment of the present disclosure, the touch sensitivity of the edge area EA may be increased by applying a tree-type high-sensitivity sensor to the edge area EA of the touch panel 130.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A touch panel, comprising:
a plurality of touch cells; and
a central area and an edge area,
wherein the plurality of touch cells is arranged in a first direction and a second direction crossing the first direction, and is located in the central area and the edge area,
the edge area comprises first to fourth sub-edge areas,
shapes of touch cells in the central area among the plurality of touch cells are different from shapes of touch cells in the edge area among the plurality of touch cells, and
shapes of touch cells in the first and second sub-edge areas among the plurality of touch cells are different from shapes of touch cells in the third and fourth sub-edge areas among the plurality of touch cells,
wherein the touch cells in the edge area each comprise:
a first electrode; and
a second electrode that does not overlap the first electrode, wherein the first electrode comprises:
a central pattern having a rectangular shape in which a length of a side extending in the first direction is shorter than a length of a side extending in the second direction; and a plurality of peripheral patterns having a rectangular shape in which a length of a side extending in the first direction is longer than a length of a side extending in the second direction, wherein, in the first sub-edge area each of a first group of the peripheral patterns extends from the central pattern in the first direction, and each of a second group of the peripheral patterns extends from the central pattern in a direction opposite to the first direction.

2. The touch panel of claim 1, wherein touch cells in the central area each have at least one of a diamond shape, a circular shape, a rectangular shape, a triangular shape, and a mesh shape.

3. The touch panel of claim 1, wherein the touch cells each comprise at least one of a metal conductive material and a transparent conductive material.

4. The touch panel of claim 1, wherein the touch cells in the first and second sub-edge areas are arranged in the first direction, and the touch cells in the third and fourth sub-edge areas are arranged in the second direction.

5. The touch panel of claim 1, wherein the first electrode and the second electrode form mutual capacitances.

6. The touch panel of claim 1, wherein the peripheral patterns extending from the central pattern in the first direction and the peripheral patterns extending from the central pattern in the direction opposite to the first direction are symmetrical to each other with respect to the central pattern.

7. The touch panel of claim 1, wherein peripheral patterns of the touch cells in the third sub-edge area among the plurality of peripheral patterns extend from the central pattern in the direction opposite to the first direction.

8. The touch panel of claim 7, wherein the peripheral patterns of the touch cells in the third sub-edge area are spaced apart from each other in the second direction.

9. The touch panel of claim 7, wherein lengths of sides of the peripheral patterns of the touch cells in the third sub-edge area extending in the first direction are about equal to each other, and lengths of sides of the peripheral patterns of the touch cells in the third sub-edge area extending in the second direction are about equal to each other.

10. The touch panel of claim 1, wherein peripheral patterns of the touch cells in the fourth sub-edge area among the plurality of peripheral patterns extend from the central pattern in the first direction.

11. The touch panel of claim 10, wherein the peripheral patterns of the touch cells in the fourth sub-edge area are spaced apart from each other in the second direction.

12. The touch panel of claim 10, wherein lengths of sides of the peripheral patterns of the touch cells in the fourth sub-edge area extending in the first direction are about equal to each other, and lengths of sides of the peripheral patterns of the touch cells in the fourth sub-edge area extending in the second direction are about equal to each other.

13. A display device, comprising:
a touch panel comprising a plurality of touch cells, a central area, and an edge area,
wherein the plurality of touch cells is arranged in a first direction and a second direction crossing the first direction, and is located in the central area and the edge area; and
a touch driver configured to sense a touch of an object approaching the touch panel, wherein the edge area of the touch panel comprises first to fourth sub-edge areas,
shapes of touch cells in the central area of the touch panel among the plurality of touch cells are different from shapes of touch cells in the edge area of the touch panel among the plurality of touch cells, and
shapes of touch cells in the first and second sub-edge areas among the plurality of touch cells are different from shapes of touch cells in the third and fourth sub-edge areas among the plurality of touch cells,
wherein touch cells in the edge area among the plurality of touch cells each comprise:
a first electrode; and
a second electrode that does not overlap the first electrode, wherein the first electrode comprises;
a central pattern having a rectangular shape in which a length of a side extending in the first direction is shorter than a length of a side extending in the second direction; and
a plurality of peripheral patterns having a rectangular shape in which a length of a side extending in the first direction is longer than a length of a side extending in the second direction,
wherein, in the first sub-edge area, each of a first group of the peripheral patterns extends from the central pattern in the first direction, and each of a second group of the peripheral patterns extends from the central pattern in a direction opposite to the first direction.

14. The display device of claim 13, wherein the touch driver transmits a touch driving signal to the touch cells, and the touch driver receives a touch sensing signal from the touch cells.

15. The display device of claim 13, wherein some of the peripheral patterns of the touch cells in the first and second sub-edge areas extend from the central pattern in the first direction, and some of the remaining peripheral patterns of the touch cells in the first and second sub-edge areas extend from the central pattern in the direction opposite to the first direction.

16. The display device of claim 13, wherein peripheral patterns of the touch cells in the third sub-edge area among the plurality of peripheral patterns extend from the central pattern in the direction opposite to the first direction.

17. The display device of claim 13, wherein peripheral patterns of the touch cells in the fourth sub-edge area among the plurality of peripheral patterns extend from the central pattern in the first direction.

18. An electronic device, comprising:
a display device comprising a touch panel, wherein the touch panel comprises:
a plurality of touch cells; and
a central area and an edge area,
wherein the plurality of touch cells is arranged in a first direction and a second direction crossing the first direction, and is located in the central area and the edge area,
the edge area comprises first to fourth sub-edge areas,
shapes of touch cells in the central area among the plurality of touch cells are different from shapes of touch cells in the edge area among the plurality of touch cells, and
shapes of touch cells in the first and second sub-edge areas among the plurality of touch cells are different from shapes of touch cells in the third and fourth sub-edge areas among the plurality of touch cells,
wherein the touch cells in the edge area each comprise:

a first electrode; and
a second electrode that does not overlap the first electrode, wherein the first electrode comprises:
a central pattern having a rectangular shape in which a length of a side extending in the first direction is shorter than a length of a side extending in the second direction; and
a plurality of peripheral patterns having a rectangular shape in which a length of a side extending in the first direction is longer than a length of a side extending in the second direction,
wherein, in the first sub-edge area, each of a first group of the peripheral patterns extends from the central pattern in the first direction, and each of a second group of the peripheral patterns extend from the central pattern in a direction opposite to the first direction.

19. The electronic device of claim 18, wherein touch cells in the central area each have at least one of a diamond shape, a circular shape, a rectangular shape, a triangular shape, and a mesh shape.

20. The electronic device of claim 18, wherein the touch cells each comprise at least one of a metal conductive material and a transparent conductive material.

* * * * *